UNITED STATES PATENT OFFICE.

THOMAS B. ALLEN, OF TORONTO, CANADA, ASSIGNOR TO THE CARBORUNDUM COMPANY, OF NIAGARA FALLS, NEW YORK, A CORPORATION OF PENNSYLVANIA.

ALUMINOUS ABRASIVE.

1,268,533.  Specification of Letters Patent.  Patented June 4, 1918.

No Drawing.  Application filed August 7, 1917.  Serial No. 184,983.

*To all whom it may concern:*

Be it known that I, THOMAS B. ALLEN, a subject of the King of Great Britain, residing at Toronto, Canada, have invented a new and useful Improvement in Aluminous Abrasives, of which the following is a full, clear, and exact description.

This invention relates to a new and useful improvement in the manufacture of aluminous abrasives. Aluminous abrasives are now commonly made by the use of an electrically developed heat process usually consisting in subjecting aluminous ore such as emery, bauxite or clay, usually with the addition of a reducing agent, such as carbon, to heat in an electric furnace until the product is fused and then allowing it to cool and crystallize. These electrically prepared abrasives have a wide field of usefulness, nevertheless despite their great efficiency they have not succeeded in displacing the natural emery in a variety of grinding and polishing operations since they are distinguished from the latter not only in their chemical composition but also in their physical properties. They are in general of greater hardness and toughness than natural emery and for this reason certain grinding operations are best accomplished by the natural abrasive and with more economical results.

In the manufacture of artificial abrasives by electrically developed heat there are always present both in microscopic and macroscopic amounts certain impurities usually of a metallic nature or having the characteristics of reduction products, which result from the reduction of impurities in the aluminous ore either by added carbonaceous material or by the action of the electrodes. These impurities are usually compounds of metallic iron with silicon, titanium or other elements and must be removed substantially before an abrasive of satisfactory properties can be produced, because usually their presence causes great difficulty in the manufacture of suitable grinding and polishing articles, especially in the proper binding of the abrasive grain. Furthermore, electrically prepared abrasives are very expensive, due to the high cost of electrodes, electric energy and the maintenance cost of electric furnace operations. Moreover their manufacture is limited to those regions where a plentiful supply of electric energy and other necessities exists.

I have discovered that I can produce a crystalline artificial aluminous abrasive material resembling natural emery in some characteristics and can avoid all the difficulty inherent in electrically prepared abrasives by subjecting aluminous ore or aluminous mixture to fuel heat or heat generated in a combustion furnace and I have found that the combustion of fuel, oil preferably, under strongly reducing conditions gives good results in this method. In choosing a suitable mixture for melting, it is necessary to consider the abrasive qualities such as hardness, toughness and fracture that are desired. These properties are determined by the proportion of the components of the mixture and by the chemical composition of the components. I have found that substances containing from 65% to 85% of alumina, and 10% to 20% iron oxid, 3% to 10% of silica and 2% to 5% titanium oxid yield a satisfactory product. I prefer to take as a raw material a bauxite ore consisting after calcining of about 80% alumina, 10% iron oxid, 7% silica and 3% titanium oxid. Such an ore is readily selected from available bauxite ores or may be arrived at by mixing aluminous ores with the other above mentioned components. The materials are reduced to a fine state of subdivision so that all will pass through a ¼" mesh and preferably finer. After thoroughly mixing they are fed into a fuel heated furnace by which a thorough heating and a partial sintering may be effected. For this purpose I have found that a rotary kiln lined with a suitable refractory lining to be preferable, acting as a pre-heater. The thoroughly heated or partially sintered material is then placed in a crucible in which the final heating is accomplished. By means of oil flame a temperature of 3400° F. may be obtained and I find this is sufficient to effect the further and final fusion of the material. I find it is not necessary to have the material brought to a very liquid state; indeed for many purposes merely obtaining the material in a molten state is sufficient to yield a satisfactory product. If desired, the preheating can be dispensed with and the entire operation accomplished in a single stage with the oil fuel. During the preheating and in the final heating it is preferable to have a strongly reducing atmosphere in order that the iron oxid present assume a ferrous state in which state it has a much greater fluxing power than when in the higher state of oxidization. A final melting may be made in a graphite crucible or in a vessel lined with a suitable refractory material and the heat may be supplied indirectly or directly.

I do not limit myself to the method of heating here described, and in carrying out the operation on a large scale the heat may be accomplished by playing several jets of the oil flame upon the surface of the mass to be heated, the new material being dropped on in powdered form under the flame and an ingot be built up making the process practically continuous. The oil flame may be displaced with a flame of powdered coal or gas.

The material crystallizes on cooling, forming a dark crystalline mass characterized by great hardness and toughness. An examination under the microscope shows that the material consists very largely of very minute crystals of $Al_2O_3$. These rarely reach a diameter of one-hundredth of a millimeter and are usually much less. There is also a large amount, approximately 25%, of finely divided black opaque material, which to some extent is included in the $Al_2O_3$ crystals but appears to be more generally distributed about them and together with the $Al_2O_3$ crystals appears to be held together with some sort of an isotropic matrix. This is colorless except for an occasional brownish stain. It appears to have a high index of refraction and probably is largely uncrystallized $Al_2O_3$.

The present invention is not limited to the details of procedure hereinbefore set forth, but may be practised with various variations within the scope of the following claims.

I claim:

1. As a new article of manufacture, crystalline fused aluminous abrasive material, containing more than 60% of crystalline alumina, the major portion of the alumina crystals having an average diameter of less than one-hundredth of a millimeter.

2. As a new article of manufacture, crystalline fused aluminous abrasive material, containing at least 60% of crystalline alumina and more than 10 per cent. of silica and oxids of iron and titanium, the major portion of the alumina crystals having an average diameter of less than one-hundredth of a millimeter.

In testimony whereof, I have hereunto set my hand.

THOMAS B. ALLEN.

Witnesses:
SAM'L S. DIEMN,
ARTHUR BATTS.